Aug. 14, 1962     D. J. HANSEN     3,049,415
APPARATUS FOR MIXING FUEL WITH AIR

Filed Dec. 16, 1957     2 Sheets-Sheet 1

INVENTOR:
Donald J. Hansen

By Smyth & Roston
Attorneys

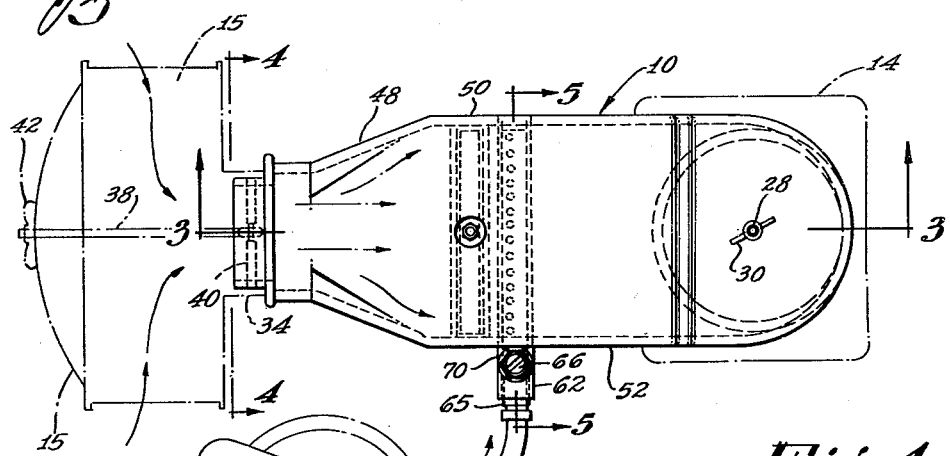
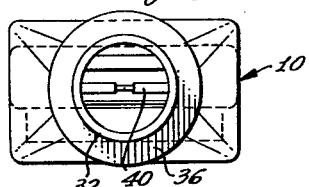
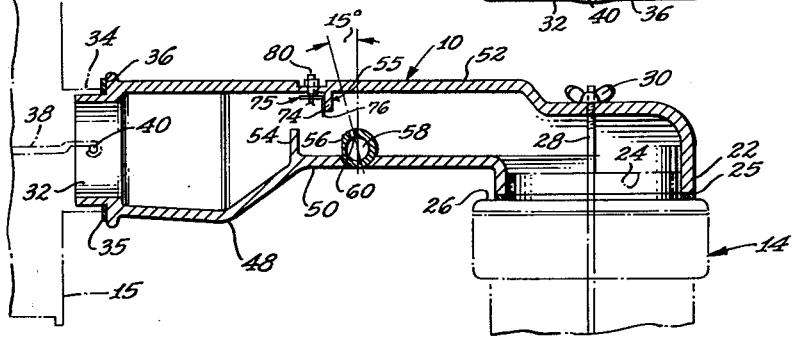

3,049,415
APPARATUS FOR MIXING FUEL WITH AIR
Donald J. Hansen, 3937 W. 106th St., Inglewood, Calif.
Filed Dec. 16, 1957, Ser. No. 703,089
3 Claims. (Cl. 48—180)

This invention relates to methods of and means for intermixing two gaseous fluids. While the invention is widely applicable for its purpose, the initial embodiment is directed to the particular purpose of mixing gaseous fuel such as butane with air for the fuel intake of an internal combustion engine of an automotive vehicle. This initial embodiment of the invention is described herein by way of example and will provide adequate guidance for those skilled in the art who may have occasion to apply the same principles to other specific purposes.

Liquid butane for the internal combustion engine of an automotive vehicle is held in supply under pressure and is released in gaseous form by a suitable regulator for intermixture with the air stream at the engine intake. The problem is to intermix the gaseous fuel with the intake air stream in a uniform manner.

The usual arrangement for mixing gaseous fuel with the intake air stream provides a venturi throat of circular cross section in the air intake passage with circumferentially spaced radial bores around the throat for directing the gaseous fuel radially inward into the air stream. This conventional arrangement is not satisfactory. The engine behaves as if the fuel were fed in periodic slugs instead of in a smooth manner.

The present invention is based on the discovery of certain defects that account for the poor performance of the described arrangement. One defect is that a jet of gaseous fuel directed into a rapid air stream radially thereof has a limited range of penetration and this range is not adequate to reach into the central axial region of the usual air stream. Thus the fuel penetrates into only a peripheral region of the air stream. A second defect is that there is insufficient turbulence in the air stream to cause inward migration of the introduced fuel. Because of these two defects only an outer annular portion of the air stream that reaches the engine is enriched with fuel, the axial core of the air stream being extremely lean if not entirely void of fuel.

The present invention meets this problem by correcting both of these defects. The first defect is corrected by narrowing the air stream to a thin ribbon so that the depth or thickness of the air stream is well within the range of penetration by fuel jets. Accordingly, the fuel jets are spaced across the width of the shallow air stream. The second defect is corrected by directing the ribbon-like air stream along a tortuous path immediately upstream from the fuel jets to create adequate turbulence in the region of fuel introduction. The created turbulence is of such character as to ensure thorough and uniform blending of the fuel and air before the mixture reaches the engine.

The preferred embodiment of the invention is a fuel mixer in the form of a passage structure for conveying the air stream, which passage structure is shaped and dimensioned to carry out the described mixing process. One end of the mixer is of circular configuration for connection with the usual filter for intake air and the other end is of circular configuration to permit the passage structure to be mounted on the engine. The intermediate portion of the mixer is of flattened cross-sectional configuration to spread the air stream in width and correspondingly to reduce the depth or thickness of the air stream. A series of staggered transverse baffles provide the tortuous path for setting up the desired turbulence in this flattened portion of the mixer upstream from the point of fuel introduction.

The gaseous fuel enters a transverse feed passage in the mixer and this transverse feed passage has bores spaced across the width of the flattened air stream to provide the required plurality of fuel jets. In this regard a feature of the invention is the concept of making one of the transverse baffles of hollow construction to serve as the transverse feed passage.

The arrangement of baffles forms a restriction or venturi throat adjacent the hollow fuel-feeding baffle with the fuel jets directed into the expanding air stream immediately downstream from the restriction. A further feature of the present embodiment of the invention is the discovery that optimum results are obtained with the fuel jets inclined slightly upstream.

The various features and advantages of the invention may be understood from the following detailed description considered with the accompanying drawings.

In the drawings, which are to be regarded as merely illustrative:

FIGURE 2 is a plan view of the mixer;

FIGURE 3 is a longitudinal section of the mixer taken as indicated by the line 3—3 of FIGURE 2;

FIGURE 3a is an enlarged portion of FIGURE 3;

FIGURE 4 is an end view of the mixer as seen along the line 4—4 of FIGURE 2;

Figure 6:
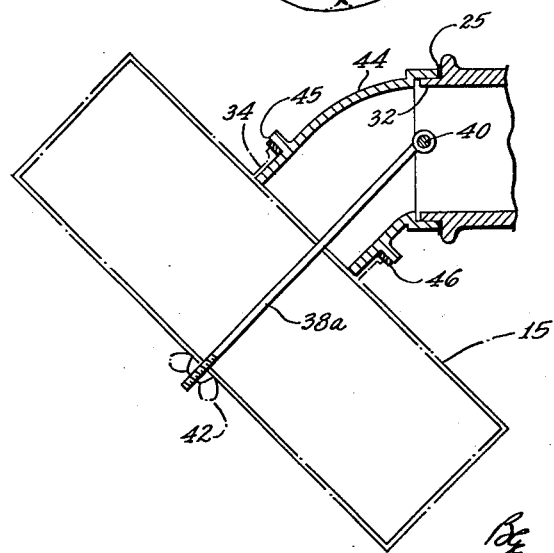

FIGURE 5 is an enlarged transverse cross-section taken along the line 5—5 of FIGURE 2 showing the construction of the transverse fuel feed passage of the mixer; and FIGURE 6 is a fragmentary view in longitudinal cross section showing how a special elbow fitting may be employed to mount the air cleaner in downwardly inclined position on the end of the mixer with freedom for the air cleaner to swivel to an upwardly inclined position.

Figure 1:
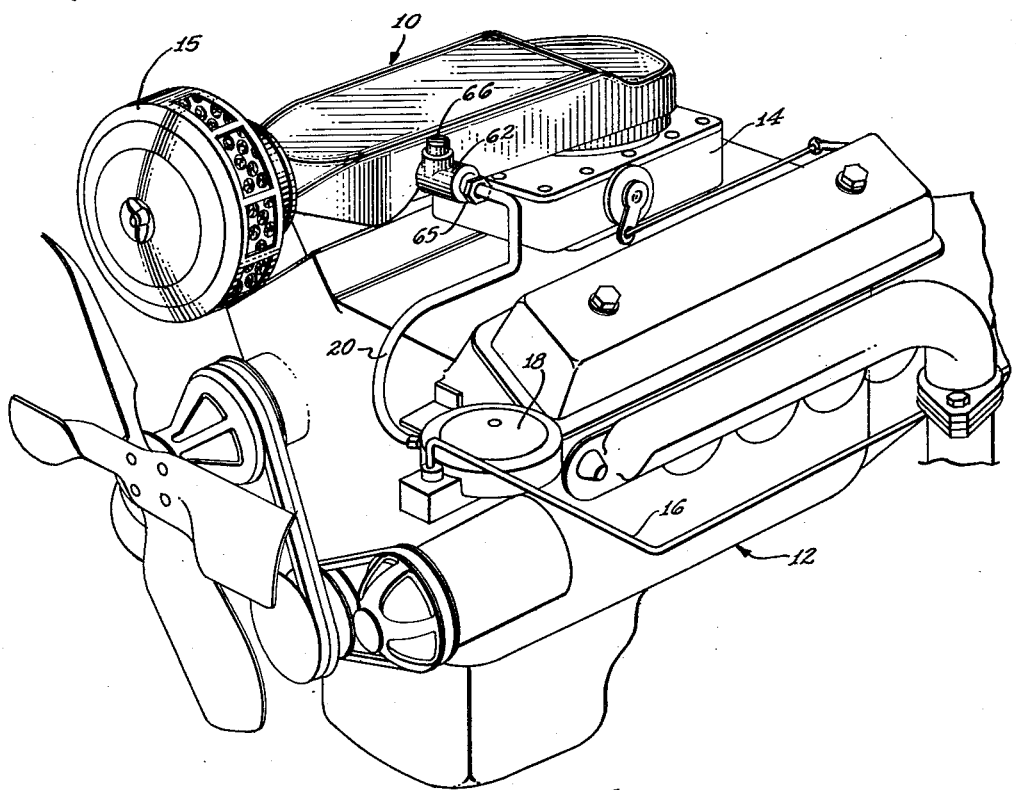
FIGURE 1 is a perspective view of an internal combustion engine of an automotive vehicle equipped with a mixer embodying the presently preferred practice of the invention.

FIGURE 1 shows how a mixer, generally designated by the numeral 10 embodying the presently preferred practice of the invention may be installed on an internal combustion engine 12 of an automotive vehicle. The mixer 10 is mounted by one end on a carburetor 14 and the other end carries the usual air filter 15. The pressurized supply of liquid butane is delivered by tubing 16 to a regulator 18 that reduces the pressure and permits the liquid fuel to vaporize. The vaporized fuel from the regulator 18 is supplied to the side of the mixer 10 by tubing 20. The regulator 18 may, for example, be of the construction set forth in the Hansen Patent 2,787,286.

As shown in FIGURES 2 and 3, the downstream end of the mixer 10 is formed with a cylindrical flange 22 by means of which the mixer is mounted on the carburetor 14. In the construction shown, the cylindrical flange 22 telescopes over a corresponding cylindrical flange 24 of the carburetor and abuts a suitable gasket 25 which is compressed against a circumferential shoulder 26 of the carburetor. The mixer is releasably secured by a suitable tie rod 28, the inner end of which is anchored inside the carburetor. The tie rod 28 extends through the wall of the mixer 10 and is threaded at its outer end to receive a thumb nut 30 that may be tightened against the mixer to place the tie rod under tension.

The inlet end of the mixer 10 is formed with a circular flange 32 that telescopes into a corresponding circular flange 34 of the air filter 15. The joint is sealed against air intrusion by a gasket 35 in compression between the edge of the circular flange 34 and a circumferential shoulder 36 of the passage structure. The air filter 15 is secured in place by a tie rod 38 that hooks over a diametrical pin 40, the opposite ends of the diametrical pin being anchored to the mixer flange 32. The tie rod 38 extends through the air filter 15 and is threaded at its outer end to receive the usual thumb nut 42.

In some instances, and especially in instances when there is limited head room, it is desirable to incline the air cleaner 15 downward. For this purpose the air cleaner 15 may be mounted on a special elbow fitting 44 in the manner indicated in FIGURE 6. One end of the elbow fitting 44 telescopes over the end flange 32 of the mixer 10 in abutment against a gasket 25 and the other end telescopes into the circumferential flange 34 of the air cleaner 15. The elbow fitting has a circumferential shoulder 45 to cooperate with the air cleaner flange 34 for placing a gasket 46 under sealing pressure. A tie rod 38a hooks over the diametrical pin 40 at its inner end and is provided with the usual thumb nut 42 at its outer end. Since there is freedom for relative rotation between the special elbow fitting 44 and the flange 32 of the mixer on which it is mounted, it is apparent that the elbow fitting may swivel to place the air cleaner in an upwardly inclined position whenever desired.

The mixer 10 may be regarded as comprising a circular inlet portion formed by the end flange 32, a transition portion 48 wherein the cross-sectional configuration is changed progressively from circular to rectangular, a tortuous throat portion 50 of rectangular cross-sectional configuration, a diffuser portion 52 also of rectangular configuration and an outlet portion formed by the second end flange 22. The transition portion 48 spreads the air stream to a configuration of susbtantial width and shallow depth and the tortuous throat portion 50 subjects the ribbon-like air stream to a succession of abrupt changes in direction for the purpose of creating susbtantial turbulence. The gaseous fuel is introduced into the air stream as it leaves the tortuous throat portion 50 and the turbulent air is permitted to expand to a certain extent in the diffuser portion 52. The result of the turbulence and expansion is thorough blending of the gaseous fuel with the air before the air reaches the carburetor 14.

In this particular embodiment of the invention, the tortuous throat portion 50 has a succession of three staggered baffles 54, 55 and 56. As may be seen in FIGURE 3, the baffle 54 extends upward at the end of the transition portion 48 of the mixer, the baffle 55 extends downward from the upper wall of the mixer and the baffle 56 extends upward from the lower wall. It is to be noted that the effect of the baffles is not only to provide a tortuous path for the air stream but also to restrict the air stream with consequent increase in velocity of the air stream. Thus the three baffles permit the gaseous fuel to be introduced with a venturi effect.

The baffle 56 is of hollow or tubular configuration to form a feed passage 58 and this feed passage is provided with a series of spaced bores 60 to serve as nozzles for projecting jets of the gaseous fuel into the turbulent air stream. The feed passage 58 is continuous with a nipple 62 that is integral with the mixer 10 and extends laterally therefrom. The nipple 62 is provided with an internal screw thread 64 to receive a fitting 65 by means of which the previously mentioned tubing 20 is connected to the mixer. For the purpose of adjusting the rate of flow of the gaseous fuel into the feed passage 58 a suitable adjustment screw 66 is mounted in a threaded bore 68 as shown in FIGURE 5 in a position to extend into the nipple 62 to throttle the flow of fluid therethrough. The screw 66 may be locked at adjusted positions by a lock nut 70.

Preferably the baffle 55 is adjustable to permit the air stream to be variably restricted as it follows its tortuous path. For this purpose, the baffle 55 may be of the construction shown in FIGURE 3a, comprising a fixed dependent transverse flange 74 and an adjacent transverse angular member 75. The angular member 75 has a vertical leg 76 coextensive with the fixed flange 74 and has an upper horizontal leg 78. The angular member 75 is adjustably supported by a screw 80 having a reduced end portion 82 that extends through the horizontal leg 78. In the construction shown, the angular member 75 rests on a washer 83 and a cotter pin 84 that extends through the screw. The angular member is pressed downward against the washer and cotter pin by a leaf spring 85 that backs a shoulder 86 of the screw. The screw 80 is threaded into the upper wall of the mixer 10 and is provided with a lock nut 88.

It is apparent that the effective dimension of the baffle 55 depends on the extent to which the angular member 75 extends below the fixed flange 74. This dimension may be readily varied by adjustment of the screw 80.

The manner in which the invention serves its purpose may be readily understood from the foregoing description. The air stream entering the mixer or passage structure 10 from the air filter 15 is spread into a relatively thin wide stream by the transition portion 48 and this stream is processed by the tortuous throat portion 50 for the creation of turbulence therein and for simultaneous acceleration of the air stream. As the thin turbulent air stream passes over the final baffle 56 to expand into the diffuser portion 52 the numerous jets of fuel penetrate through the complete depth or thickness of the air stream and as the turbulent air stream expands in the diffuser portion 52, the gaseous fuel and the air blend into a uniform mixture.

As indicated in FIGURE 3, the series of bores 60 in the feed passage 58 are inclined upstream 15° from a plane prependicular to the longitudinal axis of the mixer. In other words, the bores are inclined forwardly at an angle of approximately 75° from the axis of the mixer. In this particular configuration of the mixer, this particular angle of inclination of the jets of fuel has been found to give the best result. If two of the three baffles are omitted the mixer will not function; and if the fuel is introduced on the upstream side of the baffles the mixer will not function. If the jets of fuel are inclined downstream instead of upstream the mixer operation is not satisfactory.

My description in specific detail of the selected embodiment of the invention will suggest various changes, substitutions and other departures from my disclosure within the spirit and scope of the appended claims.

I claim:

1. In an apparatus for mixing fuel with air to form a combustible mixture for an internal combustion engine or the like, the combination of: means forming a passage for flow of a stream of air therethrough in response to a pressure differential, at least a portion of said passage being of a flattened cross-sectional configuration of a depth that is shallow relative to its width to give the air stream a corresponding flattened configuration and being of restricted cross-sectional area for acceleration of the air stream; means in said portion of the passage presenting surfaces for impingement by the air stream to make a longitudinal portion of the air stream highly turbulent; a series of jet openings distributed across the width of the passage to introduced said fuel into said turbulent portion of the air stream, said passage being susbtantially increased in cross-sectional area downstream from said jet openings to favor diffusion of the fuel in the air stream; and a transverse feed passage means extending across said passage, said transverse passage means having said jet openings therein and the wall of the transverse passage means forming one of said impingement surfaces.

2. A combination as set forth in claim 1 in which said nozzle openings are at an upstream inclination.

3. In an apparatus for mixing fuel with air to form a combustible mixture for an internal combustion engine or the like, the combination of: means forming a passage for flow of a stream of air therethrough in response to a pressure differential, at least a portion of said passage being of a flattened cross-sectional configuration that is shallow relative to its width to give the air stream a corresponding flattened configuration; a plurality of staggered baffles extending across the width of said portion of the passage from the opposite walls of the passage to reduce the thickness of the air stream to substantially less than the depth of the passage and to provide corresponding baffle surfaces for impingement by the air stream to create a turbulent zone in the air stream; and a series of nozzle openings distributed across the width of said passage adjacent and downstream from one of said baffle surfaces, said nozzle openings being directed across the narrow dimension of said passage and being inclined upstream of the passage, said baffles including two successive oppositely directed baffles and a third baffle downstream therefrom to give said air stream a tortuous configuration, said nozzle openings being adjacent and downstream from the impingement surface of said third baffle and being inclined upstream, said third baffle having said nozzle openings therein and being hollow to form a transverse feed passage to supply the fuel to the nozzle openings.

References Cited in the file of this patent

UNITED STATES PATENTS

| | | |
|---|---|---|
| 1,121,868 | Riotte et al. | Dec. 22, 1914 |
| 1,464,333 | Pembroke | Aug. 7, 1923 |
| 2,645,463 | Stearns | July 14, 1953 |

FOREIGN PATENTS

| | | |
|---|---|---|
| 1,050,545 | France | Jan. 8, 1954 |